(12) United States Patent
Bowers (10) Patent No.: US 9,339,886 B2
(45) Date of Patent: May 17, 2016

(54) METHOD OF AND A WELDING STATION FOR LAYING A PIPELINE, WITH PIPE SECTION WELDED TOGETHER BY INTERNAL AND EXTERNAL WELDING

(75) Inventor: Jonathan Bowers, Hull (GB)

(73) Assignee: Saipem S.p.A., Milan (IT)

( * ) Notice: Subject to any disclaimer, the term of this patent is extended or adjusted under 35 U.S.C. 154(b) by 932 days.

(21) Appl. No.: 13/513,481

(22) PCT Filed: Nov. 30, 2010

(86) PCT No.: PCT/GB2010/051995
§ 371 (c)(1),
(2), (4) Date: Aug. 13, 2012

(87) PCT Pub. No.: WO2011/067589
PCT Pub. Date: Jun. 9, 2011

(65) Prior Publication Data
US 2012/0298628 A1 Nov. 29, 2012

(30) Foreign Application Priority Data

Dec. 1, 2009 (GB) .................................. 0921078.2

(51) Int. Cl.
*B23K 10/02* (2006.01)
*B23K 9/028* (2006.01)
(Continued)

(52) U.S. Cl.
CPC ............. *B23K 9/0284* (2013.01); *B23K 9/0213* (2013.01); *B23K 9/0286* (2013.01); *B23K 9/167* (2013.01); *B23K 9/1735* (2013.01);
(Continued)

(58) Field of Classification Search
CPC ............. B23K 37/0276; B23K 9/0213; B23K 9/0284; B23K 9/0286; B23K 9/167; B23K 9/1735; B23K 10/02; B23K 2201/10
See application file for complete search history.

(56) References Cited

U.S. PATENT DOCUMENTS 3,223,816 A 12/1965 Marsden
3,511,283 A 8/1966 Iannone
(Continued)

FOREIGN PATENT DOCUMENTS

AU 2005100993 A4 1/2006
CN 1468160 A 1/2004
(Continued)

OTHER PUBLICATIONS

Machine translation of Japan Patent No. 8-238,567, Sep. 2015.*
(Continued)

*Primary Examiner* — Geoffrey S Evans
(74) *Attorney, Agent, or Firm* — Buchanan Ingersoll & Rooney PC (57) ABSTRACT

A method of laying a pipeline is described in which both internal and external weld passes are performed in order to weld together the pipe sections. The method includes arranging a pipe section adjacent to the end of a pipeline thereby defining a circumferential joint to be welded, performing an external weld pass, with for example GMAW—MIG torches, on the root of the joint to be welded during which weld material is deposited in the root of the joint to be welded, thereby forming a root weld, and then performing an internal weld pass, with for example a GTAW—TIG torch, on the root weld during which the root weld is melted and re-shaped. The method has particular application in relation to pipes clad with corrosion resistant alloy.

18 Claims, 10 Drawing Sheets

(51) Int. Cl.

| | |
|---|---|
| *B23K 9/167* | (2006.01) |
| *B23K 9/173* | (2006.01) |
| *B23K 37/02* | (2006.01) |
| *F16L 13/02* | (2006.01) |
| *B23K 9/02* | (2006.01) |
| *C21D 9/50* | (2006.01) |

(52) U.S. Cl.
 CPC ............ *B23K37/0276* (2013.01); *F16L 13/02* (2013.01); *B23K 10/02* (2013.01); *B23K 2201/10* (2013.01); *C21D 9/50* (2013.01)

(56) References Cited

U.S. PATENT DOCUMENTS

| | | | | |
|---|---|---|---|---|
| 3,424,887 | A | * | 1/1969 | Fehlman ..................... 219/60 R |
| 3,437,787 | A | * | 4/1969 | Chyle ........................ 219/137 R |
| 3,858,026 | A | | 12/1974 | Edwards et al. |
| 4,134,529 | A | | 1/1979 | Hara et al. |
| 4,285,460 | A | * | 8/1981 | Clavin .......................... 228/212 |
| 4,306,134 | A | * | 12/1981 | Slavens et al. ............. 219/60 A |
| 4,500,764 | A | | 2/1985 | Girodi et al. |
| 4,525,616 | A | | 6/1985 | Slavens |
| 4,857,701 | A | | 8/1989 | Slavens |
| 5,001,326 | A | | 3/1991 | Stava |
| 5,148,000 | A | * | 9/1992 | Tews ......................... 219/125.11 |
| 5,593,605 | A | * | 1/1997 | Jones ........................ 219/121.63 |
| 5,750,955 | A | * | 5/1998 | Yoshino ............... B23K 33/004 219/121.46 |
| 5,996,878 | A | * | 12/1999 | LaCount ......................... 228/25 |
| 6,020,918 | A | | 2/2000 | Murphy |
| 6,060,688 | A | | 5/2000 | Bosio |
| 6,313,426 | B2 | | 11/2001 | Belloni et al. |
| 6,417,488 | B1 | | 7/2002 | Takeuchi et al. |
| 8,777,517 | B2 | | 7/2014 | Bianchi |
| 2004/0009042 | A1 | * | 1/2004 | Belloni et al. ................. 405/170 |
| 2007/0205009 | A1 | * | 9/2007 | Figenschou ..................... 174/47 |
| 2009/0230104 | A1 | * | 9/2009 | Domec et al. ............ 219/121.78 |
| 2010/0147047 | A1 | * | 6/2010 | Kerdiles et al. .............. 72/367.1 |
| 2013/0195557 | A1 | * | 8/2013 | Bertaso et al. ................ 138/147 |

FOREIGN PATENT DOCUMENTS

| | | | |
|---|---|---|---|
| CN | 101417364 | A | 4/2009 |
| DE | 196 38 228 | A1 | 2/1998 |
| DE | 19638225 | A1 | 2/1998 |
| EP | 0 824 986 | A1 | 2/1998 |
| EP | 0 854 767 | B1 | 4/2001 |
| FR | 2 914 979 | A1 | 10/2008 |
| FR | 2914979 | A1 * | 10/2008 |
| FR | 2 914 979 | B1 | 7/2009 |
| JP | 59-232690 | A | 12/1984 |
| JP | 5-008036 | A | 1/1993 |
| JP | 7-290244 | A * | 11/1995 |
| JP | 8-141739 | A * | 6/1996 |
| JP | 08-238567 | A * | 9/1996 |
| JP | 2000-000691 | A | 1/2000 |
| JP | 2000-153356 | A | 6/2000 |
| JP | 2002-035956 | A * | 2/2002 |
| JP | 2003-3220430 | | 8/2003 |
| RU | 2 155 655 | C2 | 9/2000 |
| RU | 2 236 334 | C2 | 9/2004 |
| RU | 2 336 982 | C2 | 10/2008 |
| SU | 372048 | A1 | 3/1973 |
| SU | 1368139 | A1 | 1/1988 |
| WO | 85/05304 | A1 | 12/1985 |
| WO | 97/05983 | A1 | 2/1997 |
| WO | 00/41489 | A2 | 7/2000 |
| WO | 2006/069414 | A1 | 7/2006 |
| WO | 2008/072970 | A1 | 6/2008 |
| WO | 2008/107186 | A1 | 9/2008 |
| WO | 2008139116 | | 11/2008 |

OTHER PUBLICATIONS

Machine translation of Japan Patent No. 2002-35,956, Sep. 2015.*
Kurkin, et al., "The technology, mechanization and automation of welded structures construction," Atlas, 1989, pp. 1-3.
Jurchenko, et al., "The assembling and welding of the pipelines of corrosion resistant steels for nuclear industry," 1966, pp. 1-3.
Office Action (Request of Substantive Examination) issued on Nov. 25, 2014, by the Russian Patent Office in corresponding International Application No. PCT/GB2010/051995, and an English translation of the Office Action. (17 pages).
Search Report dated Mar. 22, 2010, issued in corresponding United Kingdom Patent Application No. GB0921078.2. (3 Pages).
"Gas Metal Arc Welding" From Wikipedia, the free Encyclopedia, http://en.wikipedia.org/wiki/Gas_metal_arc_welding, Nov. 2, 2009, pp. 1-10.
"Gas Tungsten Arc Welding" Form Wikipedia, the free Encyclopedia, http://en.wikipedia.org/wiki/Gas_tungsten_arc_welding, Oct. 7, 2009, pp. 1-11.
An English Translation of the Office Action and Search Report (Notification of the First Office Action) issued on May 20, 2014, by the State Intellectual Property Office of People's Republic of China in corresponding Chinese Patent Application No. 201080054747.5. (23 pages).
International Search Report (PCT/ISA/210) issued on Mar. 2, 2011, by the European Patent Office as the International Searching Authority for International Application No. PCT/GB2010/051995.
Written Opinion (PCT/ISA/237) issued on Mar. 2, 2011, by the European Patent Office as the International Searching Authority for International Application No. PCT/GB2010/051995.
Notification on the results of examination for patentability issued in corresponding Russian Patent Application No. 2012127437/02(042658), dated Feb. 24, 2015, and English Translation thereof.
Bertaso et al., "Improvement of Fatigue Life of SCR and OOL in West Africa," OTC 19192, (May 8, 2008), pp. 1-8.
Offshore Standard DNV-OS-F101, "Submarine Pipeline Systems," Det Norske Veritas, (Oct. 2007), (240 pages).
Smith, "Engineering with Clad Steel," NiDI (Nickel Development Institute) Original of this paper presented at The Offshore Technology Conference, Houston, (May 4-7, 1992 Updated 2001), (22 pages).
Office Action (Communication Pursuant to Rule 114(2) EPC) issued on Feb. 5, 2016, by the European Patent Office in corresponding European Patent Application No. 10788387.8-1702. (13 pages).

* cited by examiner

METHOD OF AND A WELDING STATION FOR LAYING A PIPELINE, WITH PIPE SECTION WELDED TOGETHER BY INTERNAL AND EXTERNAL WELDING

BACKGROUND OF THE INVENTION

The present invention relates to an apparatus and method for welding pipes together. In particular, but not exclusively, the invention relates to welding together clad pipe sections, or other multilayer pipe sections, when laying pipelines underwater at sea.

When laying a pipeline at sea from a pipe-laying vessel, one end of the pipeline (sometimes referred to as the "pipe string") is held by the vessel and a pipe section is welded to the end of the pipeline. The pipeline and newly welded pipe section are then fed out from the vessel, so that the process can be repeated. The weld joint must be of high quality in view of the high tensile loads to which the pipeline is subjected during the laying process. Quality of weld joints is critical when the pipeline will, once installed, be in a position where it is exposed to regular changing motion in the sea (for example when the pipeline is in the form of a catenary riser). In such case, the weld joint must be able to withstand the fatigue loads to which it will be subjected.

Pipelines designed to convey liquid or gases that are corrosive or otherwise able to damage normal steel pipes are typically internally clad or otherwise lined with CRA (corrosion resistant alloy). Also, such CRA-lined pipelines are increasingly found to offer an economic solution to the exploitation of remote wells. CRA-lined pipes are made by metallurgically bonding, or pressing, a CRA cylinder to the inside of a carbon steel (CS) pipe.

Figure 1A:
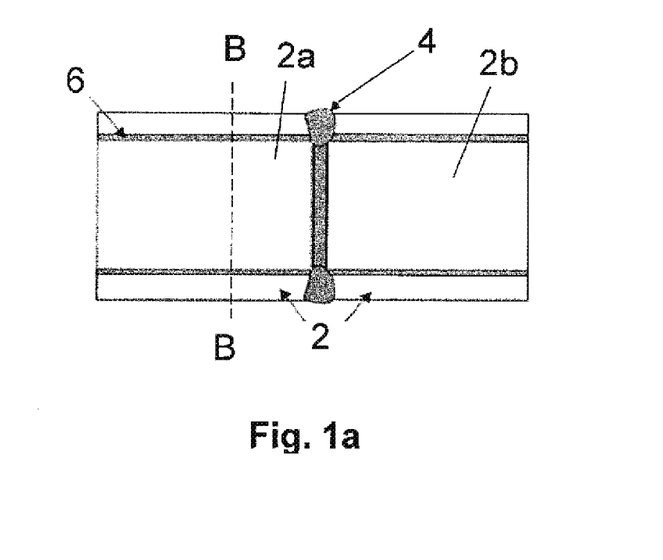
FIG. 1a is a longitudinal cross-sectional view of two CRA-clad pipes that have been welded together in accordance with conventional techniques.
Figure 1B:
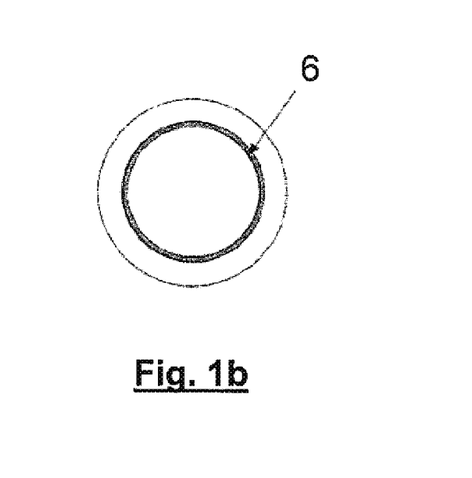
Figure 2:
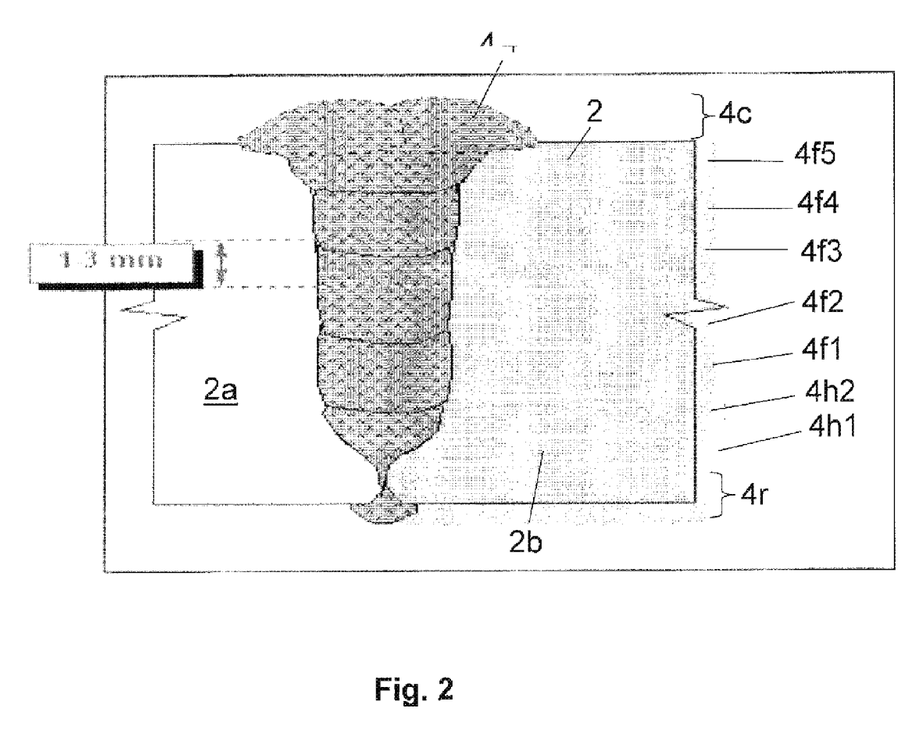
FIG. 2 is a longitudinal cross-section of a weld-joint between two pipes that have been welded together in accordance with conventional techniques.

The process of welding together CRA-lined pipes is more complex than welding of normal CS pipeline. It should be noted that the production rate for a CRA pipeline is typically a factor of 4 or 5 times less than that of a CS pipeline of the same dimensions. A typical CS pipe clad with CRA materials and the weld joint formed therebetween is shown in FIGS. 1$a$, 1$b$ and 2.

A known technique for welding together CRA-lined pipe sections is to use a single externally mounted semi-automated GMAW welding head for depositing the critical first pass indicated as root pass, followed by an internal inspection to ensure the quality of the root weld is of a sufficiently high standard. The weld area is purged with protective shielding gas (usually an inert gas such as argon) to reduce the risk of oxidation of the weld material. The internal inspection includes an ultrasonic testing regime and a visual inspection performed with the aid of cameras. The visual inspection is required because the ultrasonic testing can be prone to false results due to residual magnetization of the CRA material.

As a result of the nature of the root-welding process, it is difficult to ensure proper weld penetration. The whole welding process is very sensitive to variations in many parameters such as joint fit-up, levels of magnetism and even small changes in gas composition. Despite the large degree of automation that such a welding process provides, the acceptance of the weld still remains very dependent on the skill of the welder. The overall cycle time to complete the first two root passes and perform the internal inspection is relatively extended. Furthermore, if the root weld fails to meet the strict acceptance criteria, it is generally the case that root repairs are not performed and instead the whole weld-joint is cut-out, leading to further delays. The joint is welded to the hot pass stage and internally inspected before being moved out of the welding station. When steady-state production is being achieved, a welding cycle time of about 30 minutes at the first welding station may be achieved, but achieving a welding cycle of that duration can be a challenge when laying pipeline at sea. It will be appreciated that after the root weld is finished, the pipe is moved to subsequent stations to be filled with the other weld passes and/or processed/tested in other ways. The operations at the station where the root pass is laid down tend however to be the rate-limiting step.

The present invention seeks to mitigate the above-mentioned problems. Alternatively or additionally, the present invention seeks to provide an improved method of laying a pipeline, an improved welding method, and/or an improved pipe-welding apparatus.

SUMMARY OF THE INVENTION

The present invention provides a method of laying a pipeline, in which pipe sections are welded together to form the pipeline. It will be appreciated that the pipe sections and the pipeline may be referred to simply as pipes. The method includes the steps of providing a pipe section to be welded to the end of a pipeline, arranging the pipe section adjacent to the end of the pipeline thereby defining a circumferential joint to be welded, performing an external weld pass on the root of the joint to be welded during which weld material is deposited in the root of the joint to be welded, thereby forming a root weld, and performing an internal weld pass on the root weld. Advantageously, the step of performing the internal weld pass on the root weld melts and re-shapes the root weld. The melting of the already-formed root weld may be performed to cause remelting of the internal surface to a depth of more than 0.5 mm and more preferably more than 1 mm. Such remelting of the root-weld can improve the chance of achieving full fusion at the root of the weld joint, which can otherwise be difficult to achieve reliably. The reshaping of the root weld from within the interior of the pipes can improve overall weld quality and reduce the chance of the weld being rejected as not meeting acceptability criteria.

The method includes a step of performing an external weld pass on the root of the joint to be welded and a step of performing an internal weld pass on the root weld. The apparatus for performing the external weld pass will be referred to as the external welding apparatus and the apparatus for performing the internal weld pass will be referred to as the internal welding apparatus.

The step of performing the external weld pass to form the root weld may be performed in such a way as to cause melting or deformation of the interior pipe surface in the region of the root weld. Penetration of the root weld, formed by the external weld pass, through the interior surface of the pipe can leave an irregular and undesirable weld. Reshaping of such a weld from within the pipes can be of significant benefit as explained in further detail below.

The reshaping of the root weld from inside the pipes may be performed in such a way as to reduce the risk of the weld being rejected as a result of the pipes being misaligned. If the pipe section is not exactly aligned with the adjacent end of the pipeline, there may be a "hi-lo" (a step from one pipe-section to the adjacent pipe section) at certain circumferential positions around the pipe circumference. If the hi-lo is too great, the weld will be rejected. In embodiments of the present invention hi-lo steps of the order of 1.5 mm can be accommodated, resulting in less time being required in the fitting together (aligning) of pipes. Acceptable tolerances in the shape and dimensions of sections of pipe also become less critical, allowing potential cost savings.

The use of an internal welding step, following an external welding step on the same weld, may be performed in such a way to allow for certain defects in a root weld to be repaired in a manner not previously envisaged. For example, in prior art welding methods of laying pipeline at sea, there is no repair option in the event that the root bead is rejected: in such an event, the whole weld is typically cut-out.

Remelting the root weld can improve the fullness of the fusion between the weld and pipes. Narrow bevels have been known to lead to lack of side wall fusion, especially near the root of the weld. However, the method of the invention can improve fullness of weld fusion, thereby allowing a narrow bevel to be more readily used. A narrow bevel may have a maximum width of less than 10 mm, and preferably less than 7 mm. The ratio of the thickness of the pipes (which may for example be between 10 mm and 30 mm) and the maximum width of the bevel is preferably between 10:1 and 3:1, and more preferably between 6:1 and 20:7.

The internal weld pass on the root weld is preferably performed by means of arc-welding. The internal weld pass may be performed by using a non-consumable electrode. The internal weld pass on the root weld may be performed without adding weld filler material. The internal weld pass on the root weld may for example be performed by means of an autogenous weld process. The internal weld may be performed by means of a plasma welding apparatus. The internal weld may be performed by means of a laser welding apparatus. The internal weld may be performed by means of a welding apparatus that utilises a tungsten electrode. For example, the apparatus for forming the internal weld may include a GTAW (gas tungsten arc welding) welding torch, for example a TIG (tungsten inert gas) welding torch. The internal weld pass on the root weld may be performed with the assistance of one or more cameras used to guide the internal welding. The one or more cameras may for example be used to produce a live image on a video display device. The internal welding apparatus may be partly manually controlled. For example, a welding operator may use an input device, for example a joystick, that allows the internal welding apparatus to be steered, or otherwise controlled. The internal welding apparatus may be at least partly automatically controlled. The internal welding apparatus may for example weld at a substantially constant speed along the joint to be welded. The internal welding apparatus may include an automatic welding voltage control (AVC) unit. The internal welding apparatus may include an internal line-up clamp, arranged to enable the pipes to be lined up and clamped in position ready for welding. One or more welding heads may be mounted on the internal line-up clamp (ILUC).

The step of performing the external weld pass on the root weld is preferably performed by means of arc-welding. The external welding step preferably includes adding weld filler material to the weld. The external welding step may be performed by using a consumable electrode. The external welding step may include performing a GMAW (gas metal arc welding) process. For example, the GMAW process may be a MIG (metal inert gas) process. The external welding apparatus may be at least partly automatically controlled. The external welding apparatus may for example weld at a substantially constant speed along the weld. The external welding apparatus may include an automatic welding voltage control unit. The external welding apparatus may include one or more welding torches that are arranged to automatically track (i.e. follow) the centre of the path of the joint to be welded. The welding head may be arranged to oscillate across the width of the weld joint. The external welding apparatus may include an external clamp mechanism, for example a band, on which the one or more welding heads are mounted. The external welding apparatus may include one or more welding bugs arranged to travel around the pipes.

In the case were the external weld pass on the root requires an inert gas to be used, the internal weld pass, in which the root weld is remelted, preferably results in a final surface with low oxidation properties, thus reducing the need for purging the weld area with inert gas before the external passes. For example, an internal GTAW welding process may give a final surface with low oxidation and potentially enhanced corrosion properties, and may not adversely affect the mechanical properties of the root weld, despite being remelted.

The external weld pass on the root weld may include simultaneously using a plurality of separate welding heads. For example, a plurality of heads may deposit weld material in the root at different circumferential positions around the pipes. The first external pass can be deposited faster with two or more heads being used simultaneously. Consistently achieving full penetration with the external weld pass(es) may not necessarily be required because full fusion may be later achieved by means of the internal weld pass. Two of the separate welding heads may be positioned more than 60 degrees apart around the circumference of the pipes. For example, just two external welding heads could be provided opposite each other (i.e. about 180 degrees apart).

The step of performing an internal weld pass on the root weld may include remelting the interior surface of the pipes to a depth of more than 1 mm. The depth of remelting of the interior surface of the pipes may be less than 4 mm. A typical depth of remelting may be between 1.5 and 2.5 mm.

The step of performing the external weld pass on the root of the joint may produce a root weld which on the internal surface of the pipes has a rough shape. In such a case, the internal weld pass advantageously remelts and reshapes the root weld so that on the internal surface of the pipes the root weld has a smoother shape. By smoothing the shape of the root weld on the interior surface of the pipes, the root weld may be less likely to corrode. A weld having a rough shape exposes more surface area per volume and is more likely to corrode. A weld having a rough shape may for example have an overhang when viewed in cross-section. A weld having a rough shape may for example have a cross-section, where the shape changes in height (the dimension along a radius of the pipe) by more than 1 mm over a distance (for example, along the longitudinal direction) of 1 mm. A weld having a smooth shape may be substantially flat and have no overhangs. A weld having a smooth shape may for example have no part where the shape changes in height by more than 0.5 mm over a distance of 0.5 mm. The step of performing the internal weld pass on the root weld is preferably performed such that the root weld on the internal surface of the pipes has a flatter shape than the shape of the root weld formed immediately after performing the step of the external weld pass on the root of the joint.

The step of performing the external weld pass on the root of the joint may produce a lack of fusion of the material on the bevel; the root weld is not fully fused to the pipes. In such a case, the internal weld pass advantageously remelts the root weld so that it becomes fully fused to the pipes.

For a given root weld, the method may comprise performing only one internal weld pass per weld joint. The method may include performing only two internal weld passes per weld joint. In some embodiments, the method may include performing a plurality, for example at least three, of internal weld passes per weld joint. Three or fewer internal weld passes per weld joint are preferred. The root weld may be re-shaped during each such internal weld pass.

The internal welding step may include adding weld filler material to the weld. The addition of filler metal during the internal weld pass could for example enable defects to be repaired and also to fill in root weld concavities.

The method may include a step of performing an external cap weld pass on the cap of the joint to be welded. For example, the method may include depositing weld material on the cap of the joint to be welded, thereby forming a cap weld. In such a case, step of performing the internal weld pass on the root weld may be performed before the completion of the step of performing an external cap weld pass. The internal weld pass on the root of the joint may be performed at the same time as an external weld pass is performed. The method may be performed such that the internal weld pass is started only after external weld pass on the root has been completed. The root weld may have solidified by the time the internal weld pass is conducted on the root weld The method may include a step in which non-destructive testing (NDT) is performed. For example, such NDT may be performed after performing the internal weld pass on the root weld. During the step of non-destructive testing (NDT), the quality of root weld may be inspected by means of one or more cameras inside the pipes. During the step of non-destructive testing (NDT), the quality of root weld may be tested by means of ultrasonic testing. The step of non-destructive testing (NDT) may be performed before the completion of the step of performing an external cap weld pass. The step of non-destructive testing (NDT) may use one or more cameras.

In its broadest sense the present invention covers welding together two sections of pipe which are subsequently to be welded to other sections of pipe, or a pipeline, when laying a pipeline. Thus, one of the two pipe sections may be considered as defining the end of a pipeline. More common however is the case where the pipe section is added to a pipeline which is significantly longer (more than 10 times longer for example) than the pipe section. The pipeline may extend into water, for example, when the pipeline being laid is an undersea pipeline. One end of the pipeline may of course be held above water, for example held on a pipe-laying vessel, to allow a new pipe section to be welded to the end of the pipeline.

The method of the present invention has particular application when the pipeline is multi-layer pipeline, having one metallic layer which is made from a metal different from that of an adjacent layer. For example, the pipe section may be a CRA-lined pipeline. The step of performing the external weld pass on the root of the joint may include adding weld material of a first type to the joint. The step of performing the internal weld pass on the root of the joint may include adding weld material of a second type to the joint. The weld material of the second type may be of a composition different from the first type. For example, it could be possible to weld a clad pipe externally with CS filler metal, and internally with GTAW with CRA-compatible filler material. The weld material of the second type may be of the same composition as that of the weld material of the first type. For example, it could be possible to weld a clad pipe externally and internally with CRA-compatible filler material, such as "Inconel". Together the steps of (i) performing the external weld pass and (ii) performing the internal weld pass may include adding weld material of the same type both to carbon steel material and to CRA material. For example, "Inconel" material may be used in the external weld pass, in which the Inconel material welds to both the carbon steel and the CRA material in the pipeline.

The method of the present invention has particular application when the pipeline is subject to high loads, and/or fatigue loading. For example, at least a part of the pipeline may form at least part of a catenary riser. The method may be performed as part of a method of laying a pipeline at sea. The pipeline may be an underwater or subsea pipeline.

The pipes may be welded together with the axes of the pipes being approximately horizontal. For example, the laying method may be an S-lay method. The pipes may be welded together with the axes of the pipes being more vertical than horizontal. For example, the laying method may be a J-lay method. The orientation of the pipes need not materially affect the extent to which the internal weld can be remelted or reshaped.

The present invention also provides in accordance with a second aspect of the invention, a welding station for use in a method of laying a pipeline. The welding station may include an exterior welding apparatus and an interior welding apparatus. The interior welding apparatus and the exterior welding apparatus are preferably arranged to be able to operate simultaneously. The exterior welding apparatus may include a plurality of welding heads and an external guiding apparatus, each head having at least one welding torch, the welding heads being arranged to simultaneously weld the pipe sections together from outside the pipe sections to form a weld joint and to be guided along the joint to be welded at least partly by the exterior guiding apparatus. The interior welding apparatus may include an internal line-up clamp which holds an internal guiding apparatus and at least one welding head, the welding head being arranged to remelt a weld joint formed by the exterior welding apparatus and to be guided along the joint by means of internal guiding apparatus. The internal line-up clamp may also hold non-destructive testing (NDT) equipment, including for example one or more electronic cameras, for performing NDT on the root weld from inside the pipe sections. The internal line-up clamp may include integrated plasma-welding equipment for performing the interior weld. The welding station may include an internal line-up clamp and interior welding apparatus arranged separately from the internal line-up clamp. For example, the interior welding apparatus may be provided on a carriage that is moveable independently of the internal line-up clamp. The interior welding apparatus may be so arranged to define a central open region for accommodating an umbilical or working shaft. In such a case, an existing installation of a welding station having an internal line-up clamp and umbilical assembly and an external welding apparatus may be readily modified to perform the method of the present invention by mounting an internal welding apparatus onto the internal line-up clamp of the existing installation, for example onto the front of the internal line-up clamp.

The welding heads of the exterior welding apparatus may be a consumable-electrode welding heads (such as GMAW welding heads). The welding head of the interior welding apparatus may be a non-consumable-electrode welding head. The interior welding apparatus may comprise GTAW welding equipment. The interior welding apparatus may comprise plasma welding equipment. The interior welding apparatus may comprise one or more GTAW and/or plasma welding heads.

The present invention also provides in accordance with a third aspect of the invention, a pipe-laying vessel including a plurality of welding stations arranged in series in the pipe-laying direction, wherein at least one of the welding stations is a welding station according to the present invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

An embodiment of the present invention will now be described by way of example only with reference to the accompanying schematic drawings of which:

FIG. 1b is a cross-sectional view of the pipes shown in FIG. 1a, taken along the lines B-B in FIG. 1a;

DETAILED DESCRIPTION

The presently described embodiment of the invention concerns the butt-welding together of Corrosion Resistant Alloy (CRA) clad pipe sections during a method of laying an underwater pipeline from a floating vessel. The pipeline is laid overboard a vessel by welding successive sections of pipe to the end of the pipeline. When laying a pipeline, the tension in the pipeline being laid is significant and is typically of the order of several hundreds of kilo-Newtons. During laying and subsequent use of the pipeline, the pipe joints may be subject to fatigue loading.

It is therefore of particular importance to ensure that the joints between the sections of pipe that make up the pipeline are of a very high quality. Failure of any joint in the pipeline after the joint has been lowered from the vessel into the water can be possibly dangerous and extremely costly.

FIG. 1a shows two pipe sections 2 in longitudinal cross-section. There is a first pipe section 2a connected to a second pipe section 2b by means of a weld 4. The pipe sections are carbon steel pipes internally clad with a corrosion resistant alloy (CRA) 6 (FIG. 1b), which in this case is in the form of a nickel alloy, but could also be austenitic stainless steel or other CRA materials. The weld 4 is in the form of a girth weld and is illustrated in greater detail by the section shown in FIG. 2. The weld 4 is formed by means of one or more welding torches depositing separate layers of weld material in the region between the two pipes 2a, 2b. In FIG. 2, the various layers of the weld joint, after welding, are shown. The weld joint comprises a root zone 4r, two hot pass zones 4h1, 4h2, five fill zones 4f1 to 4f5, and a weld cap zone 4c. FIG. 2 is a schematic representation of the various zones, which may not be readily discernible in the final weld, but as a rough indication of scale, each fill zone 4f has a depth which is typically of the order of 0.5 to 3 mm.

An embodiment of the present invention concerning a method of forming a pipeline in the form of a CRA-clad pipeline will now be described with reference to the FIGS. 3a to 7c.

Figure 3A:
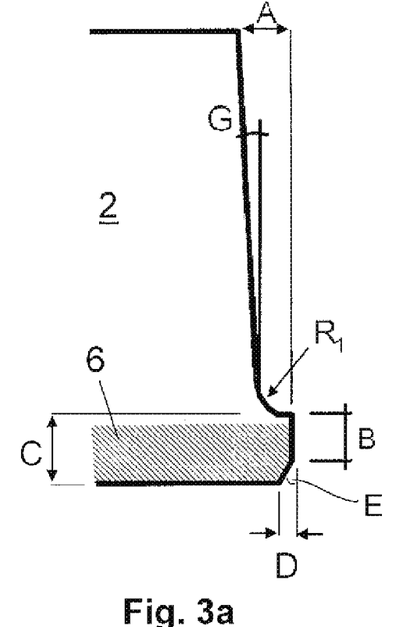
FIGS. 3a to 3c are longitudinal cross-sections of the ends of bevelled CRA-clad pipe sections to be welded by means of a method in accordance with the embodiment of the invention.
Figure 3B:
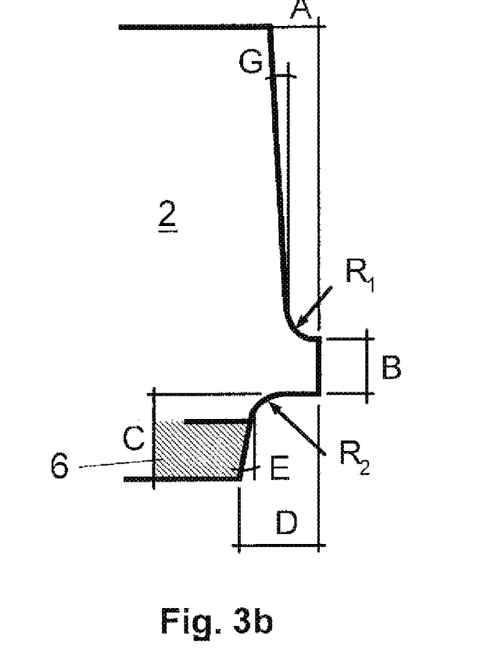
Figure 3C:
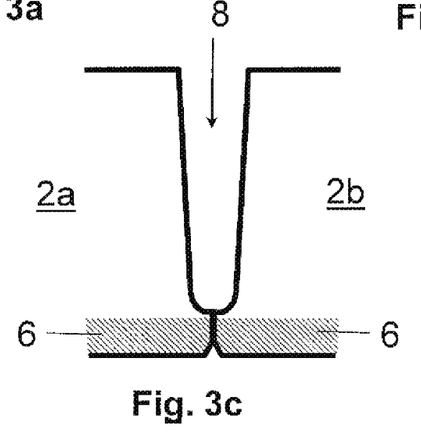

The pipeline is laid by means of welding new sections of pipe to the end of the pipeline, which is held on a pipe-laying vessel. The pipes are bevelled prior to being joined to create a gap between the pipes 2a, 2b. One pipe section 2a, is defined by the end of the pipeline being laid. The other pipe section 2b is a new pipe section being added to the end of the pipeline to extend the pipeline. Different bevel shapes are well known in the art. The bevel shape utilised in the present embodiment is one where the sides of the weld-joint to be formed, defined by the opposing ends of the pipes, are close to parallel for the majority of the depth of the weld-joint. A schematic illustration of a typical shape of bevel (before welding) is shown in FIG. 3a. An alternative geometry is shown in FIG. 3b, which will be described later. The exact choice of parameters for the dimensions of the bevel depends on many factors. In this particular embodiment (based on the geometry of FIG. 3a), the chamfer on the interior surface of the pipes (the chamfer on the CRA material 6) is absent, or very small, so that there is no gap that needs filling on the interior surface of the pipes. The parameters defining the shape of the bevel for the first embodiment (which utilises a pipe 2 having a wall thickness of about 20 mm including a 3 mm layer of CRA material 6) are therefore as follows: A=4 mm; B=3.5 mm; C=3.5 mm; D<0.1 mm; G=3°; $R_1$=3.5 mm.

The pipe sections 2a, 2b, once bevelled, are arranged end to end thereby defining a circumferential joint 8 to be welded. For example, the bevel geometry shown in FIG. 3a defines a joint 8 to be welded as illustrated schematically in FIG. 3c.

Figure 4A:
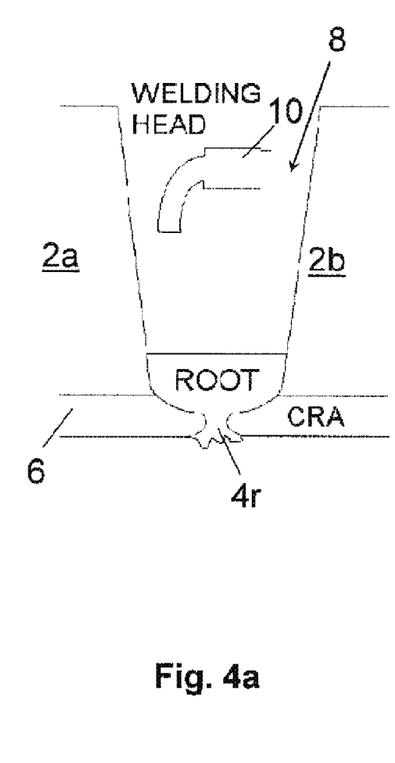
FIGS. 4a and 4b show two pipes being welded together in accordance with the embodiment of the invention.
Figure 4B:
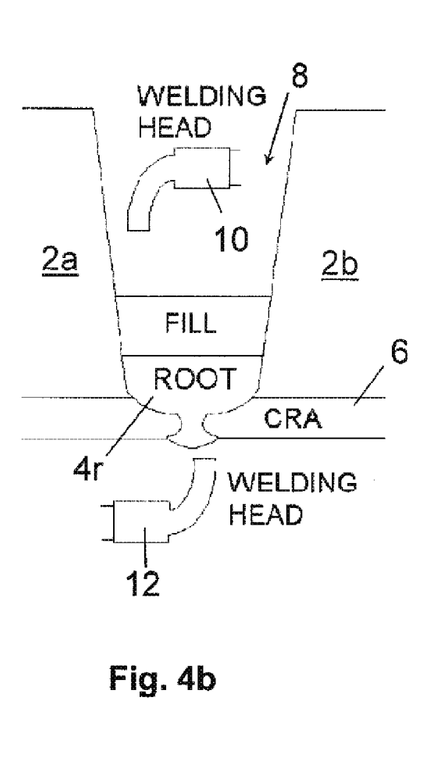
Figure 8A:
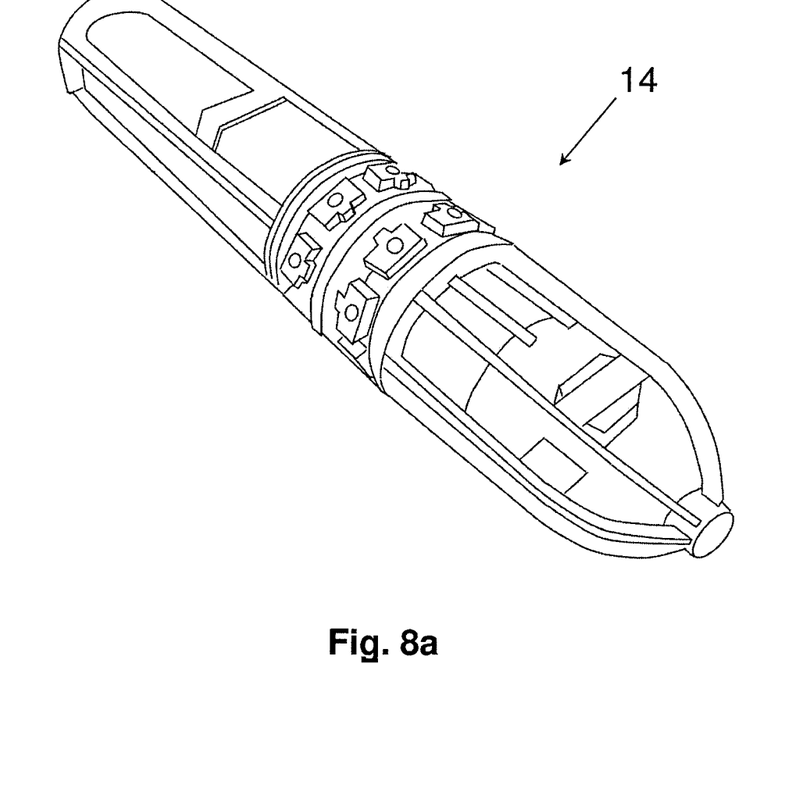
FIG. 8a shows an internal line up clamp (ILUC) in accordance with an embodiment of the invention.

Forming a high quality root weld 4r is of critical importance. A first welding station is provided for forming the root weld between the pipe sections 2a, 2b. The pipes are aligned and held in place by means of an internal line up clamp 14 an example of which is shown in FIG. 8a). The welding station includes an exterior welding apparatus including two external GMAW (MIG) welding heads arranged 180 degrees apart around the pipe-sections (i.e. on opposite sides of the pipes 2). Only one such external welding head 10 is shown in FIGS. 4a, 4b. The welding heads 10 are mounted on an external guiding apparatus clamped to the exterior of the pipes in a manner well known in the art (such as a "bug-on-band" systems). In use, the heads 10 are guided along the joint 8 to be welded partly by the exterior guiding apparatus, which includes a bevel tracking system (although in other embodiments, a weld operator may assist in the tracking and tracing of the bevel). Each exterior welding head 10 has one welding torch (but in other embodiments, each head might have two or more torches), in the form of a consumable electrode torch using filler wire. The external welding heads 10 are arranged to weld simultaneously the pipe sections together from outside the pipe sections to form a weld joint 4. Given that the weld is formed around the circumference of the pipes, the welding process is typically referred to as girth-welding.

Figure 8B:
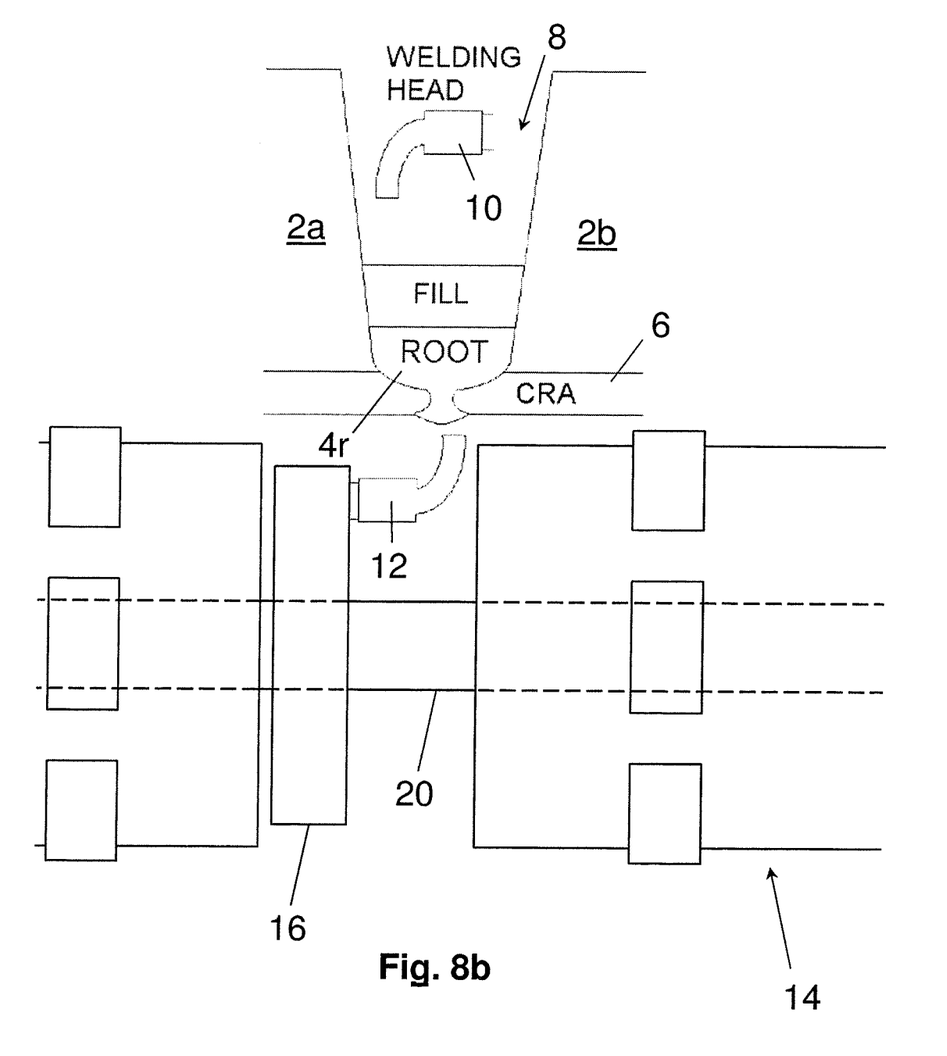
FIGS. 8b to 8c show a schematic representation of an internal line up clamp which is arranged across a weld joint.
Figure 8C:
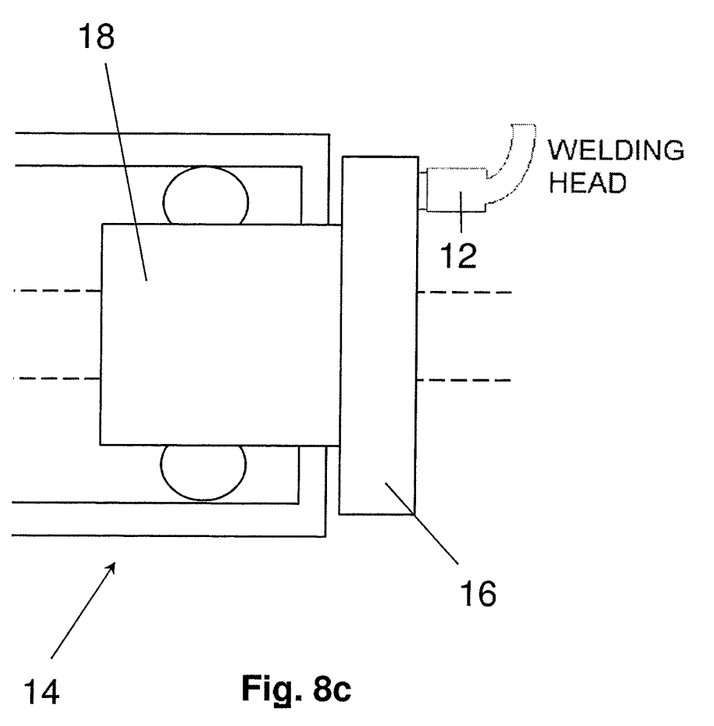

At the first welding station, there is also provided an interior welding apparatus. The interior welding apparatus includes the ILUC (internal line-up clamp—not shown in FIGS. 4a, 4b) mentioned above which holds the pipes in place. The ILUC also holds an internal guiding apparatus 16 (shown in FIG. 8b) and a single internal welding head 12. The internal welding head 12 carries a single Gas Tungsten Arc Welding GTAW (TIG) welding torch, using a non-consumable Tungsten electrode. The internal GTAW welding head is arranged to operate under the protection of inert gas, typically a mixture including Argon. In use, the internal welding head 12 is partly guided along the joint to be welded by the internal guiding apparatus 16 and partly by a welding operator. The welding operator can control movement of the welding torch across the width of the bevel (in a direction parallel to the axis of the pipes) by means of a joystick, whilst monitoring the position of the welding by means of a camera system mounted on the ILUC which provides video feedback on a video display viewed by operator. The interior welding apparatus is arranged as to define a central open region for accommodating an umbilical assembly 20. In an alternative embodiment, shown in FIG. 8c, the interior welding apparatus is provided on a carriage 18 that is movable independently of the internal line-up clamp.

The method of the embodiment includes using external welding heads 10 to perform an external weld pass on the root of the joint 8 to be welded during which weld material is deposited in the root of the joint, thereby forming a root weld 4r. Two separate external welding heads 10 are simultaneously used to deposit weld material in the root at different circumferential positions around the pipes 2. The root weld 4r then cools and starts to solidify. Whilst the external heads 10 are used to perform fill passes to form the higher layers (the hot pass zones 4h1, 4h2), the internal welding head 12 is used to perform an internal weld pass on the root weld 4r. The internal welding torch on the welding head travels at 25 cm/min and operates at 150A. This internal weld pass melts the root weld deposited by the external welding apparatus, without using any additional filler material. The root weld 4r will typically be remelted, because the weld 4r will by then have solidified, or at least partly solidified. The internal weld pass melts the root weld and surrounding material to a depth of about 1.5-2 mm. The resultant bead has a width of about 8-10 mm. This makes it relatively tolerant to variations in its lateral position, and makes it relatively easy for the welding operator to guide the internal welding apparatus with sufficient accuracy.

FIG. 4a represents the performance of external weld pass, whereas FIG. 4b represents the performance of the internal weld pass.

Changing of the shape of the root weld 4r has several potential benefits and can improve the quality of the root weld. Quality of a root weld formed solely by means of an external welding process can be adversely affected by factors such as:

- Hi-lo being too high (pipe wall misalignment, resulting from differing shapes of pipe sections and/or misalignment of the axes of the pipes), affecting structural integrity;
- Lack of root weld penetration, affecting structural integrity;
- Excess of root weld penetration, making the weld more susceptible to corrosion; and
- Root weld concavity, rough shape or the weld and/or minor defects in the weld shape, making the weld more susceptible to corrosion and/or affecting structural integrity.

A hi-lo mismatch can produce a step between the adjacent pipe-sections, which can lead to stress concentration during fatigue loading and therefore potentially affect the mechanical and structural integrity of the weld joint. An internal weld pass which melts and flattens the weld in the region of the step can therefore have the affect of improving the quality and structural strength of the weld.

If the external weld pass produces a root weld which is not fully fused to the pipes, it is likely that the lack of fusion will be near the interior surface of the pipes. The internal weld pass can therefore remelt the root weld so that it becomes better fused to the pipes. It should be noted that remelting of the root weld 4r does not adversely affect the mechanical properties of the root weld.

If the external weld pass produces a root weld with a rough shape, for example having overhangs or concavities, or a large protrusion into the interior of the pipe, the step of performing the internal weld pass on the root weld smoothes and flattens the shape of the root weld, making it less susceptible to corrosion. Minor defects in the weld, such as small cracks on or near the interior surface of the pipes can be removed by means of remelting the weld.

Figure 5A:
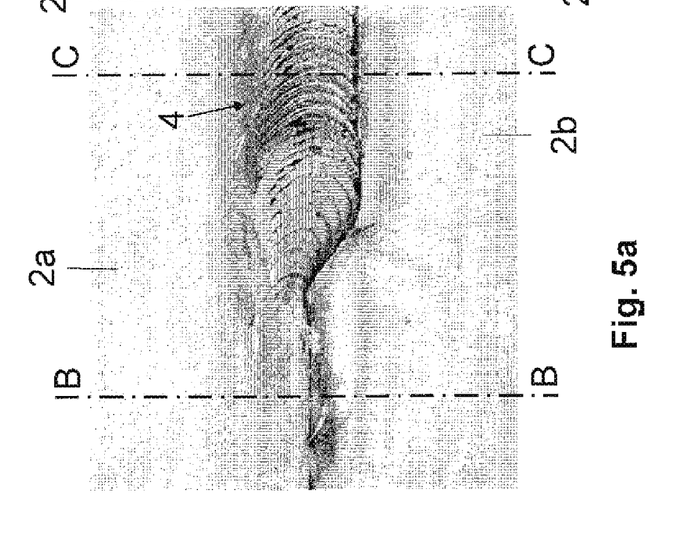
FIGS. 5a to 5c are photographs showing sections of a first pipe joint including sections showing the weld during and after performance of the welding method of the embodiment.
Figure 5B:
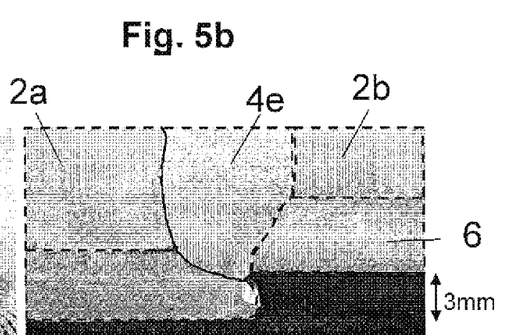
Figure 5C:
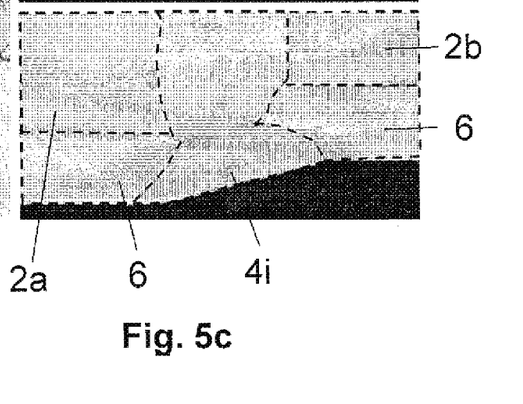

Some of the above described factors that affect weld quality and acceptability and the solutions provided by the present embodiment will now be described with reference to FIGS. 5a to 7c. FIG. 5a is a photograph of the interior surface showing the progression of an internal weld (from left to right). FIG. 5b shows a cross-section (across surface B-B indicted in FIG. 5a) of the pipes 2a, 2b in a region of the weld-root 4r that has not yet been subjected to the internal weld pass and FIG. 5c shows a cross-section (across surface C-C indicted in FIG. 5a) of the pipes 2a, 2b in a region of the weld-root 4r that has been subjected to the internal weld pass. The cross-section of FIG. 5b shows that there is a hi-lo of about 3 mm. After the internal GTAW pass the weld bead 4i on the internal surface changes the shape of the weld 4 so that the hi-lo step is changed into a gradual incline.

Figure 6A:
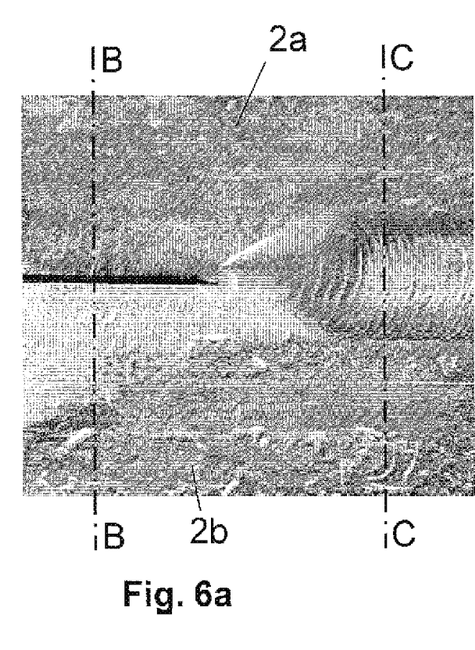
FIGS. 6a to 6c are photographs, similar to those of FIGS. 5a to 5c, but showing sections of a second pipe joint.
Figure 6B:
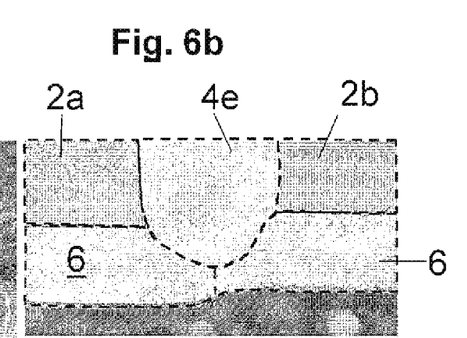
Figure 6C:
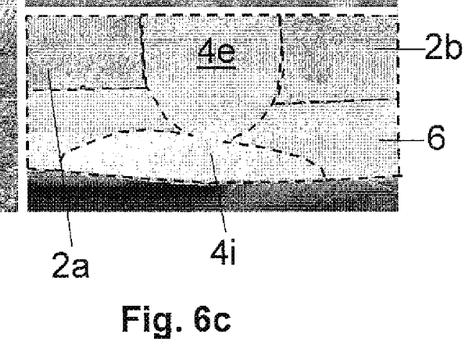

FIG. 6a is a photograph of the interior surface showing the progression of an internal weld (from left to right) on a different pair of pipe sections 2a, 2b. FIG. 6b shows a cross-section (across surface B-B indicted in FIG. 6a) of the pipes 2a, 2b in a region of the weld-root 4r that has not yet been subjected to the internal weld pass and FIG. 6c shows a cross-section (across surface C-C indicted in FIG. 6a) of the pipes 2a, 2b in a region of the weld-root 4r that has been subjected to the internal weld pass. The cross-section of FIG. 6b shows that there is a lack of penetration into the CRA layer 6 by the external weld 4e formed by the external pass, such a lack of penetration for example being due to a high root face. After the internal GTAW pass, the weld 4i on the internal surface melts the CRA layer 6 and the external weld 4e so that the weld 4 penetrates completely.

Figure 7A:
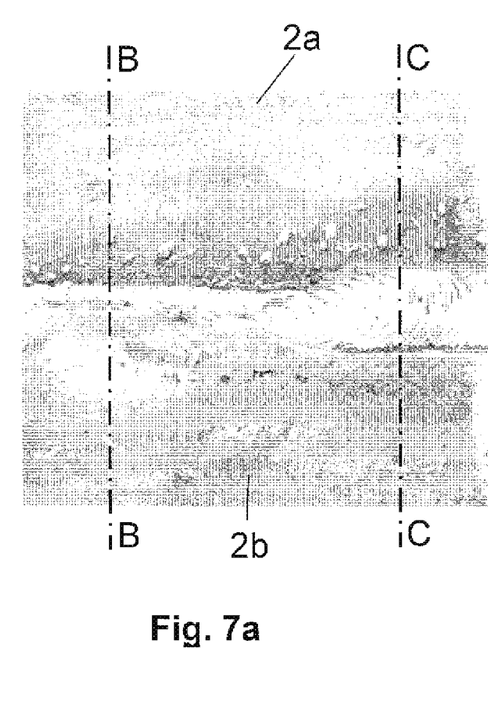
FIGS. 7a to 7c are photographs, similar to those of FIGS. 5a to 5c, but showing sections of a third pipe joint.
Figure 7B:
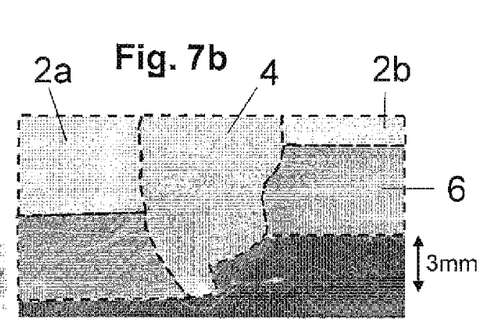
Figure 7C:
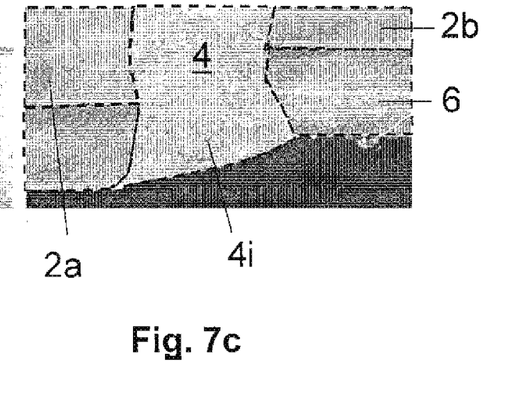

FIGS. 7a to 7c are photographs showing the internal surface and root weld 4r before and after the internal TIG pass in the presence of a 3 mm hi-lo and irregular and excessive penetration of weld material. The cross-section of FIG. 7b (taken across surface B-B indicted in FIG. 7a) shows that there is a hi-lo of about 3 mm and an overhang of weld material with a very rough and sharp-edged profile. Especially insofar as the right-hand pipe section 2b is concerned, there is an excessive amount of penetration of the weld material. As shown in FIG. 7c (which shows a cross-section across surface C-C indicted in FIG. 7a), after the internal GTAW pass, the weld bead 4i on the internal surface changes the shape of the weld 4 so that the hi-lo step is changed into a gradual incline and the overhang and rough shape of the weld is flattened and smoothed.

Thus, the shape of the root weld can be significantly improved to provide enhanced fatigue performance, increase the prospects of a full fusion of the root weld, and reduce the presence of defects in the pipe joint.

After the internal weld pass has been completed the root weld solidifies again. The internal welding step may include making one, two or even three passes with the internal welding apparatus. After the internal weld passes on the root weld have been completed, non-destructive testing (NDT) is performed at the first welding station. The NDT tests include both inspecting the root weld with ultrasonic sensors and performing a visual inspection of the interior of the pipes with the use the camera system mounted on the ILUC. If a weld defect is detected, the defect may be one that is able to be repaired simply by performing one or more further internal weld passes, and using the GTAW to remelt the root weld. In contrast to the normal weld passes made during the method of this embodiment of the invention, the one or more internal weld passes used to repair the root weld may include adding weld filler material.

Following NDT operations, and repair processes if deemed necessary, at the first station, the pipe sections then be moved to the subsequent welding stations where yet more external weld passes are performed including the final cap weld.

The method and apparatus of the above-described embodiment has many advantageous features:

- The first external pass can be deposited much more quickly with two heads being used simultaneously and higher travel speeds. This is made possible because, consistently achieving full penetration with this external bead is not required, since full fusion can be achieved internally by the GTAW pass.
- Significantly reduced welding cycle times and increased productivity.
- High assurance of full bead fusion and full penetration is achieved through the remelting of the inner 1.5 to 2 mm of the internal surface by the GTAW torches.
- The profile of the internal bead is extremely flat and optimal for corrosion and/or fatigue resistant properties.
- The reshaping of the internal bead shape can be achieved in all welding positions, irrespective of pipe orientation.
- The technique has a high tolerance to variations in pipe fit-up. Less time therefore is required in the fitting together of pipes at the first station. Pipe tolerances also become less critical in the procurement process of clad pipe, as pipes can be joined with sufficient weld quality with hi-lo values of up to 3 mm, which might allow for a cost reduction in these items.
- The GTAW process used on the internal weld pass is relatively simple, does not require filler wire, and has high reliability.
- Prior art techniques for welding clad pipe have required the bevel to be relatively wide in order to achieve full penetration from the first external pass. Because achieving full penetration externally is not critical when an internal GTAW pass is subsequently applied, the overall width of the bevel can be reduced. This has the benefit of reducing the number of fill passes. It also has the potential of reducing the defect rate in the fill passes, because there is a greater tendency for lack of fusion defects to be produced in the higher passes with the increased oscillation widths required for wider bevels.
- The use of GTAW internally allows a degree of repair of the root bead in the event of rejection since the bead can be remelted by a further pass. In prior art techniques, there has been no repair option in the event of rejection of the root bead and consequently the whole weld is typically cut-out.
- Since the root pass is remelted, there is no need for purging of the weld area before the external weld passes. The internal GTAW process gives a final weld bead surface with low oxidation and enhanced corrosion properties.

The apparatus may of course also be used with different bevel geometries. The bevel geometry may be adapted as appropriate. Factors that should be borne in mind include: 1) the root face may need to be thick enough to sustain the first external weld, if copper backing shoes are not used; 2) dimension C must be thicker than the clad layer, so as to reduce involve CRA material during the welding of the first external pass; 3) there may be a need to provide an internal groove for the internal welding apparatus and to use filler material on the internal pass, in which case dimension D and angle E will need to be sized to allow the TIG arc to reach fully into the groove, but not too large to avoid the deposition of excessive quantity of filler metal.

The apparatus of the above-described embodiment can be used on a bevel geometry as shown in FIG. 3b. The bevel shown in FIG. 3b may be defined by a set of parameters as follows: A=3.2 mm; B=2.3 mm; C=3.8 mm; D=4.0 mm; E=15°; G=3°; $R_1$=3.2 mm; and $R_2$=2.4 mm. It will be observed that such parameters require the use of filler material on the internal weld pass(es) in order to bridge the groove formed between the pipe sections 3a, 3b on the interior surface of the pipes. The choice of bevel dimensions and the manner in which the internal and external welding is performed needs careful consideration when performing heterogeneous welding between CS and CRA materials, especially in view of the possible negative consequences on the metallurgy of the resulting welded joint. For example, high Ni alloys are often subject to hot cracking due to: 1) large amplitude of the solidification gap, worsened by dilution with different materials (such as carbon steel); 2) presence of impurities (S, P, low-melting metalloid) in the weld area; and 3) dilution, Ni percentage dropping to the range 30%-50% results in a high susceptibility to hot cracking. It is believed that in practice, it will be permissible (in terms of the risk to structural integrity) to weld a CS base material with CRA filler material, but not vice versa. In any case, there are benefits in reducing the amount of dilution of the CRA material in order not to prejudice the anti-corrosion properties of the CRA material. In the present embodiments, the geometry of the bevel, allows the external weld to be performed on CS base material using CS filler wire, and allows the internal weld to be subsequently performed on CRA base material using a suitable filler wire (for example "Inconel" wire, an austenitic nickel-chromium-based super-alloy made by Special Metals Corporation, of New York, US).

It should be noted that the choice of bevel may also affect the interaction between the internal and external arcs (GTAW and GMAW) if such arcs are used simultaneously and cross the same position at the same time. The arcs may interact by means of the magnetic field related to one torch, disturbing and causing deviation in the other (magnetic blow effect). Simultaneous use of internal and external arcs at the same position could overheat the material being welded potentially leading to a burn through, that could damage either or both of the torches and/or produce an unacceptable defect. However, one layer of weld deposit has been found to provide sufficient protection against undesirable effects as a result of simultaneous use of both internal and external arcs.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The apparatus of the above described embodiment may be used to weld together standard (non-clad) steel pipes. The embodiment has for example application on carbon steel catenary risers which are highly fatigue sensitive.

The internal welding pass to perform root weld shape control can be performed at any point between depositing the external root pass to full completion of all external welding passes. There is no need for the internal weld pass to be performed at the first welding station.

The internal welding means may, instead of comprising a Gas Tungsten Arc Welding GTAW (TIG) welding torch, comprise a plasma-welding torch.

There may be further developments that could be made to improve effectiveness and reliability, which are set out below:
  Evaluation of PAW (or Plasma-MIG Hybrid) technology for the improvement of travel speed, penetration control and electrode durability for the internal weld pass.
  Evaluation of TIG hot-wire process to improve filler metal deposition, if required for the internal weld pass.
  Evaluation and study of special fluxes available on the market, which permit an increase of penetration with TIG process. This could help to solve eventual problems due to the wettability of different materials during heterogeneous welding.
  Evaluation of different gas mixture compositions with the addition of small quantities of $H_2$, that should improve penetration and limit bead surface oxidation.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of laying an undersea pipeline, in which pipe sections are welded together to form the pipeline, wherein the method includes the following steps:
   providing a pipe section to be welded to the end of an undersea pipeline, the pipeline being in the form of a multi-layer pipeline, having one metallic layer which is made from a metal different from that of an adjacent layer,
   arranging the pipe section adjacent to the end of the pipeline thereby defining a circumferential joint to be welded,
   performing an external weld pass on the root of the joint to be welded during which a plurality of separate welding heads simultaneously deposit weld material in the root at different circumferential positions around the pipes, thereby forming a root weld, and
   performing an internal weld pass on the root weld using plasma welding equipment during which the root weld is melted and re-shaped.

2. A method according to claim 1, wherein the step of performing the external weld pass on the root weld is performed by using a consumable electrode.

3. A method according to claim 1, wherein
   the step of performing the external weld pass on the root of the joint produces a root weld which on the internal surface of the pipes has a rough shape, and
   the step of performing the internal weld pass on the root weld remelts and reshapes the root weld so that on the internal surface of the pipes the root weld has a smoother shape.

4. A method according to claim 1, wherein
   the step of performing the external weld pass on the root of the joint produces a root weld which is not fully fused to the pipes, and
   the step of performing the internal weld pass on the root weld remelts the root weld so that it becomes fully fused to the pipes.

5. A method according to claim 1, wherein
   the method includes a step of performing an external cap weld pass on the cap of the joint to be welded during which weld material is deposited on the cap of the joint to be welded, thereby forming a cap weld, and
   the step of performing the internal weld pass on the root weld is performed before the completion of the step of performing an external cap weld pass.

6. A method according to claim 1, wherein after the step of performing the internal weld pass on the root weld, a step of non-destructive testing is performed, during which the quality of root weld is inspected by means of one or more cameras inside the pipes.

7. A method according to claim 1, wherein the method includes performing a plurality of internal weld passes per weld joint.

8. A method according to claim 1, wherein
   the pipeline is a carbon steel pipeline with a corrosion resistant alloy interior, and
   at least one of the steps of (i) performing the external weld pass on the root of the joint and (ii) performing the internal weld pass on the root of the joint, includes adding weld material having the same composition both to carbon steel material in the pipeline and to corrosion resistant alloy material in the pipeline.

9. A welding station for use in a method of laying an undersea pipeline, in which pipe sections are welded together to form the pipeline being in the form of a multilayer pipeline, having one metallic layer which is made from a metal different from that of an adjacent layer, wherein the welding station includes:
   exterior welding apparatus including a plurality of welding heads and external guiding apparatus, each head having at least one welding torch, the welding heads being arranged to simultaneously weld the pipe sections together from outside the pipe sections to form a weld joint and to be guided along the joint to be welded at least partly by the exterior guiding apparatus,
   an internal line-up clamp for holding the aligned pipe sections in place, and
   interior welding apparatus having at least one welding head having a plasma welding torch, the welding head being arranged to remelt a weld joint formed by the exterior welding apparatus and to be guided along the joint by means of internal guiding apparatus,
   wherein
   the exterior welding apparatus is arranged to be able to operate simultaneously with the interior welding apparatus.

10. A welding station according to claim 9, wherein the welding heads of the exterior welding apparatus are consumable-electrode welding heads.

11. A welding station according to claim 9, wherein the internal line-up clamp also holds non-destructive testing equipment for performing non-destructive testing on the root weld from inside the pipe sections.

12. A welding station according to claim 9, wherein
the internal line-up clamp includes an umbilical assembly, and
the interior welding apparatus defines a central open region accommodating said umbilical assembly.

13. A welding station according to claim 9, wherein the internal line-up clamp holds the internal guiding apparatus.

14. A welding station according to claim 9, wherein the interior welding apparatus is provided on a carriage that is moveable independently of the internal line-up clamp.

15. A pipe-laying vessel arranged to lay an undersea pipeline in the form of a multi-layer pipeline, having one metallic layer which is made from a metal different from that of an adjacent layer, the pipeline laying vessel including a plurality of welding stations arranged in series in the pipe-laying direction, wherein at least one of the welding stations is a welding station, which includes:
 exterior welding apparatus including a plurality of welding heads and external guiding apparatus, each head having at least one welding torch, the welding heads being arranged to simultaneously weld the pipe sections together from outside the pipe sections to form a weld joint and to be guided along the joint to be welded at least partly by the exterior guiding apparatus,
 an internal line-up clamp for holding the aligned pipe sections in place, and
 interior welding apparatus having at least one welding head having a plasma welding torch, the welding head being arranged to remelt a weld joint formed by the exterior welding apparatus and to be guided along the joint by means of internal guiding apparatus,
 wherein
 the exterior welding apparatus is arranged to be able to operate simultaneously with the interior welding apparatus.

16. A method of laying an undersea pipeline, in which pipe sections are welded together to form the pipeline, wherein the method includes the following steps:
 providing a multi-layer pipe section to be welded to the end of a multi-layer pipeline, the multi-layers of each of the pipe section and of the pipeline having one metallic layer which is made from a metal different from that of an adjacent layer, and each of the pipe section and the pipeline having an end which is beveled;
 arranging the beveled end of the pipe section adjacent to the beveled end of the pipeline thereby defining a circumferential joint to be welded,
 performing a plurality of external weld passes to form a substantially full penetration weld, including an external weld pass on the root of the joint to be welded during which weld material is deposited in the root of the joint to be welded, thereby forming a root weld, and
 performing an internal weld pass on the root weld using plasma welding equipment during which the root weld is melted and re-shaped.

17. A method according to claim 16, wherein
the pipeline is a carbon steel pipeline with a corrosion resistant alloy interior, and
at least one of the steps of (i) performing the external weld pass on the root of the joint and (ii) performing the internal weld pass on the root of the joint, includes adding weld material having the same composition both to carbon steel material in the pipeline and to corrosion resistant alloy material in the pipeline.

18. A method according to claim 16, wherein at least a part of the pipeline forms at least part of a subsea catenary riser.

* * * * *